Jan. 1, 1924. 1,479,561
E. R. STOEKLE
REGULATING MEANS FOR DIRECT CURRENT CIRCUITS
Filed June 18, 1920
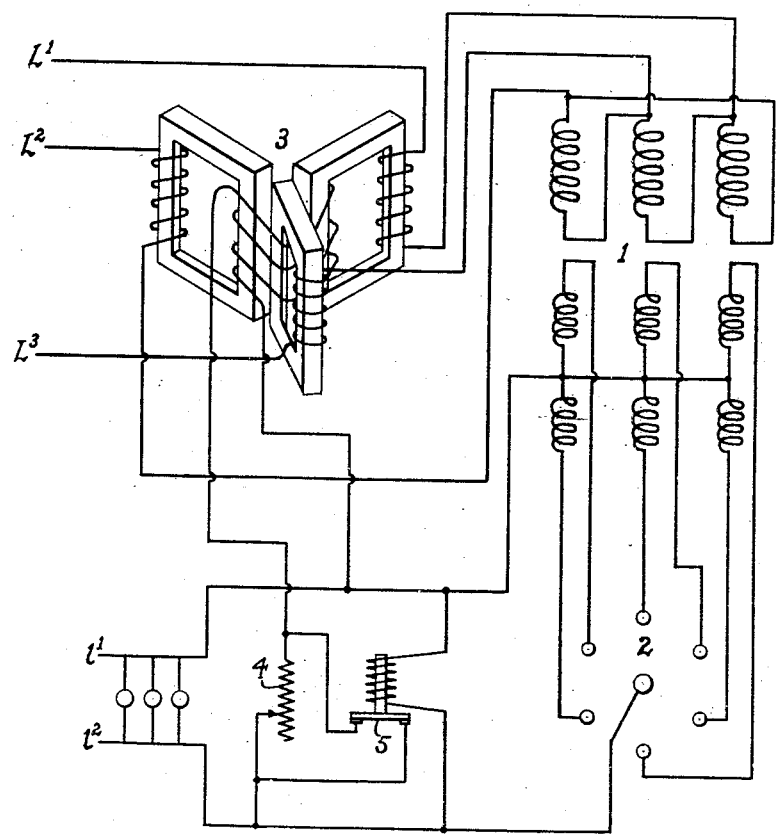
Inventor
Erwin R. Stoekle
By ~~~~
Attorney Patented Jan. 1, 1924.

1,479,561

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATING MEANS FOR DIRECT-CURRENT CIRCUITS.

Application filed June 18, 1920. Serial No. 389,903.

*To all whom it may concern:*

Be it known that I, ERWIN R. STOEKLE, a citizen of the United States, residing at Milwaukee, in the county of Milwaukee and State of Wisconsin, have invented new and useful Improvements in Regulating Means for Direct-Current Circuits, of which the following is a full, clear, concise, and exact description, reference being had to the accompanying drawing, forming a part of this specification.

This invention relates to regulating means for direct current circuits.

More particularly the invention relates to regulation of electrical conditions of such circuits which are supplied with energy from an alternating current source through a mercury arc rectifier or other converter.

An object of the invention is that of providing improved means comprising a minimum number of moving parts and adapted to act automatically for accomplishing the foregoing results with increased promptitude.

Another object is that of providing for maintaining a given electrical condition of such circuit substantially constant irrespective of variations in such condition of the supply source, or of the load upon such circuit.

According to the present invention it is proposed to regulate an electrical condition, such as voltage, of a direct current circuit to be supplied with energy in the manner aforestated, through regulation of a like condition of the energy supplied thereto, such latter regulation being effected by means of a suitable number of reactors rendered sensitive to variations in such condition of said circuit.

While the invention is capable of assuming various forms, the embodiment thereof shown diagrammatically in the accompanying drawing may for purposes of illustration be preferred.

Referring to the drawing which comprises a single figure, the same illustrates a direct current load circuit indicated by lines 1', 1² an electrical condition of which is to be controlled, said circuit to be supplied with electrical energy from alternating current lines L¹, L², L³, through a three phase transformer 1, and a mercury arc rectifier 2 or other converter.

To such end a magnetic amplifier 3 is inserted in the alternating current supply lines and subjected to control in accordance with an electrical condition of the direct current load circuit for regulating such condition of said circuit through suitable regulation of the alternating current input to the rectifier 2.

More specifically, said rectifier is preferably of the double wave type, being adapted to convert both half waves of each phase of the current supplied thereto and to such end is provided with a number of anodes equal to twice the number of phases of the supply circuit, or in the present instance six, and with a single cathode. The secondary windings of transformer 1 similarly comprise three oppositely wound pairs of coils, each pair being arranged in inductive relation to one of the transformer primary phase windings, the adjacent ends of said coils being connected to a common neutral point and the opposite ends of said coils being respectively connected with individual anodes of the rectifier. The direct current load lines 1', 1² are connected respectively to said neutral point and to the cathode of the rectifier.

The magnetic amplifier 3 comprises associated reactors each having a magnetic core and a coil arranged in one line of the supply circuit. Said cores are provided with means for varying the permeability thereof to correspondingly vary the self inductance of the respective coils for effecting a predetermined regulation of the electrical energy supplied to the converter 3 through the transformer 2. Said permeability varying means for said cores may advantageously comprise a common sensitive or regulative winding connected across the direct current lines, said coils being arranged with reference to one another to minimize their joint inductive effect upon said winding. A regulable resistor 4 is arranged to be in circuit with said regulative winding and to be short circuited therefrom by the action of a relay 5 having its actuating winding connected across said direct current lines for subjection to energization in accordance with the voltage condition thereof.

The effective length of the resistor 4 being adjusted to effect the desired standard of regulation, the operation of the device may be described as follows: If at any time the voltage across the load lines increases, due either to a reduction in load or to an increase in voltage of the supply lines, the relay 5 is adapted to open thereby including the resistor 4 in the regulative circuit of the reactors. Such action serves, through increasing the permeability of the cores of said reactors, to increase the reactance of the power coils thereof and such increase in reactance serves to reduce the voltage transmitted through said coils to the transformer 2 and thence to the rectifier 3 for correspondingly lowering the voltage of the direct current lines.

Similarly a reduction in voltage of said direct current lines permits closure of relay 5 for short-circuiting the resistor 4 and producing effects the converse of those aforedescribed.

The foregoing construction and arrangement thus provide for maintenance of a substantially constant voltage of the load lines irrespective of variations in load carried by said lines and of voltage variations of the supply lines or other variable conditions.

Obviously the reactors may, with similar advantage, be located between the transformer and the rectifier, thus subjecting only the secondary circuit of the transformer to direct regulation. Also said double wave transformer and rectifier may be substituted by ordinary three phase devices. Further it is obvious that by well known expedients the relay 5 may be rendered sensitive to other variable conditions, such as current conditions, of the load lines whereby the device is adapted to regulate such other condition of said lines, also the device may, by obvious means, be adapted to use in conjunction with supply circuits which differ in phase from that described.

I claim—

1. The combination with an electric circuit, of a double wave converted to receive electrical energy from a polyphase alternating current source for supplying direct current to said circuit and means for regulating an electrical condition of said circuit comprising a number of reactors equal to the number of phases of said supply source, said reactors having means rendered sensitive to such electrical condition of said circuit and coils subjected to control by said means for regulating a like condition of the electrical energy supplied to said converter.

2. The combination with an electric circuit, of a converter to receive electrical energy from an alternating current source for supplying direct current to said circuit and means for regulating an electrical condition of said circuit comprising a reactor winding connected across said circuit and a resistor to be in circuit with said winding, means responsive to such electrical condition of said circuit for effecting inclusion and exclusion of said resistor and means subjected to influence of said winding for regulating a like condition of the electrical energy supplied to said converter.

3. The combination with an electric circuit, of means for supplying direct current thereto comprising a transformer and a double wave converter to be supplied by said transformer, and means for regulating an electrical condition of said circuit comprising a magnetic amplifier having parts subjected to influence in accordance with such condition of said circuit for regulating a like condition of the electrical energy supplied to said converter.

4. The combination with an electric circuit an electrical condition of which is to be controlled, of a converter to receive electrical energy from a polyphase alternating current source for supplying direct current to said circuit and means for regulating an electrical condition of said circuit comprising a number of reactors equal to the number of phases of such supply source, each reactor comprising a core having a coil arranged in circuit in one phase of such source and means for regulating the permeability of said cores including a common circuit connected across the circuit an electrical condition of which is to be controlled, and rendered sensitive to variations in an electrical condition of said latter circuit for varying the reactance of said coils to regulate a similar electrical condition of the energy supplied to said converter.

5. The combination with an electric circuit an electrical condition of which is to be controlled, of a converter to receive electrical energy from a polyphase alternating current source for supplying direct current to said circuit and means for regulating the voltage of said circuit comprising a number of reactors equal to the number of phases of such supply source, each reactor comprising a core having a coil arranged in circuit in one phase of such source and a common winding for said cores connected across the circuit an electrical condition of which is to be controlled, a resistor to be included in the circuit of said winding and a relay rendered sensitive to variations in voltage of the controlled circuit for effecting inclusion and exclusion of said resistor to regulate the voltage supplied to said converter through variations in the reactance of the coils of said amplifier.

In witness whereof, I have hereunto subscribed my name.

ERWIN R. STOEKLE.